US012697775B2

(12) United States Patent
Merritt et al.

(10) Patent No.: US 12,697,775 B2
(45) Date of Patent: *Aug. 4, 2026

(54) METAL PLATED ADDITIVELY MANUFACTURED PLASTIC ACM SHROUDS WITH INTERNAL THERMALLY ADAPTIVE STRUCTURE

(71) Applicant: Hamilton Sundstrand Corporation, Charlotte, NC (US)

(72) Inventors: Brent J. Merritt, Southwick, MA (US); Viktor Kilchyk, Lancaster, NY (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/357,585

(22) Filed: Jul. 24, 2023

(65) Prior Publication Data

US 2025/0033282 A1    Jan. 30, 2025

(51) Int. Cl.
B29C 64/30 (2017.01)
B29C 64/106 (2017.01)
(Continued)

(52) U.S. Cl.
CPC ............ B29C 64/30 (2017.08); B29C 64/106 (2017.08); B33Y 10/00 (2014.12); B33Y 40/20 (2020.01);
(Continued)

(58) Field of Classification Search
None
See application file for complete search history.

(56) References Cited

U.S. PATENT DOCUMENTS 3,326,726 A    6/1967  Bassett, Jr. et al.
3,513,881 A    5/1970  Kinsell
(Continued)

FOREIGN PATENT DOCUMENTS

CN        114423927 A      4/2022
DE        10250758 A1      5/2004
(Continued)

OTHER PUBLICATIONS

Extended European Search Report for EP Application No. 24182403. 6, dated Jun. 2, 2025, pp. 1-11.
(Continued)

*Primary Examiner* — Seyed Masoud Malekzadeh
*Assistant Examiner* — Vipul Malik
(74) *Attorney, Agent, or Firm* — CANTOR COLBURN LLP

(57) ABSTRACT

Forming a shroud for an ACM by: forming a base having discrete sections including: a first section defining connecting features for connecting with a fixed ACM structure; a second section positioned adjacent to a compressor rotor when installed in the ACM; and a third section disposed adjacent to a drive ring bearing when installed in the ACM; forming the base includes: printing thermoplastic polymer surfaces, respectively from thermoplastic polymers, disposed against each other, a first thermoplastic polymer surface having a CTE, and a second thermoplastic polymer surface having a second CTE; forming a lower support section on the base by printing along the discrete sections of the base a mixture of a third thermoplastic polymer and a catalyst formed with metal; and forming an upper support section on the shroud by depositing on the lower support section, along each of the discrete sections, via electrolysis deposition, a metallic coating.

15 Claims, 13 Drawing Sheets

(51) Int. Cl.

| | | |
|---|---|---|
| *B29K 55/02* | (2006.01) |
| *B33Y 10/00* | (2015.01) |
| *B33Y 40/20* | (2020.01) |
| *B33Y 80/00* | (2015.01) |
| *B64C 27/32* | (2006.01) |
| *C25D 7/00* | (2006.01) |
| *B64C 1/00* | (2006.01) |

(52) U.S. Cl.

CPC .............. *B33Y 80/00* (2014.12); *B64C 27/32* (2013.01); *C25D 7/00* (2013.01); *B29K 2055/02* (2013.01); *B29K 2995/0012* (2013.01); *B64C 2001/0072* (2013.01)

(56) References Cited

U.S. PATENT DOCUMENTS

| | | | |
|---|---|---|---|
| 3,687,365 | A | 8/1972 | Laessig |
| 4,327,154 | A | 4/1982 | Rossmann |
| 4,418,549 | A | 12/1983 | Courneya |
| 4,441,653 | A | 4/1984 | Grudich |
| 4,454,983 | A | 6/1984 | Tarvis, Jr. |
| 4,851,285 | A | 7/1989 | Brotz |
| 4,939,038 | A | 7/1990 | Inabata |
| 5,230,850 | A | 7/1993 | Lewis |
| 5,634,189 | A | 5/1997 | Rossmann et al. |
| 5,720,339 | A | 2/1998 | Glass et al. |
| 5,769,389 | A | 6/1998 | Jacobsen et al. |
| 6,100,463 | A | 8/2000 | Ladd et al. |
| 6,161,382 | A | 12/2000 | Brotz |
| 6,182,929 | B1 | 2/2001 | Martin et al. |
| 6,371,437 | B1 | 4/2002 | Kenny et al. |
| 7,037,076 | B2 | 5/2006 | Jacot et al. |
| 7,147,269 | B2 | 12/2006 | Aase et al. |
| 7,650,910 | B2 | 1/2010 | Welle |
| 7,686,040 | B2 | 3/2010 | Welle |
| 7,721,762 | B2 | 5/2010 | Welle |
| 7,753,654 | B2 | 7/2010 | Read et al. |
| 7,770,959 | B2 | 8/2010 | Browne et al. |
| 7,854,467 | B2 | 12/2010 | Mcknight et al. |
| 7,922,456 | B2 | 4/2011 | Mcmillan |
| 7,967,568 | B2 | 6/2011 | Dalton et al. |
| 8,119,206 | B2 | 2/2012 | Hougham et al. |
| 8,205,668 | B2 | 6/2012 | Freese, V |
| 9,181,933 | B2 | 11/2015 | Daly et al. |
| 9,719,536 | B2 | 8/2017 | Ashmawi et al. |
| 9,752,442 | B2 | 9/2017 | Hayford et al. |
| 9,784,126 | B2 | 10/2017 | Army et al. |
| 9,897,078 | B2 | 2/2018 | Nicholson et al. |
| 9,919,470 | B2 | 3/2018 | Behl et al. |
| 9,981,421 | B2 | 5/2018 | Marcoe et al. |
| 10,053,239 | B2 | 8/2018 | Mabe et al. |
| 10,543,897 | B2 | 1/2020 | Brown et al. |
| 10,731,666 | B2 | 8/2020 | Skertic |
| 10,815,976 | B2 | 10/2020 | Kaneko et al. |
| 10,976,119 | B2 | 4/2021 | Veto et al. |
| 10,982,783 | B2 | 4/2021 | Srinivasa Murthy |
| 11,008,943 | B2 | 5/2021 | Tajiri et al. |
| 11,110,647 | B2 | 9/2021 | Marcoe et al. |
| 11,167,836 | B2 | 11/2021 | Hethcock, Jr. |
| 11,192,333 | B2 | 12/2021 | Hahnlen |
| 11,248,592 | B1 | 2/2022 | Tsuruta et al. |
| 11,268,520 | B2 | 3/2022 | Melo et al. |
| 11,359,287 | B2 | 6/2022 | Philibert |
| 11,655,346 | B2 | 5/2023 | Jackson et al. |
| 11,668,316 | B1 | 6/2023 | Kilchyk et al. |
| 12,162,606 | B1 | 12/2024 | Merritt et al. |
| 12,384,515 | B2 | 8/2025 | Kilchyk et al. |
| 2001/0008357 | A1 | 7/2001 | Dhuler et al. |
| 2003/0025093 | A1 | 2/2003 | Kenny et al. |
| 2005/0005983 | A1 | 1/2005 | Lewis |
| 2007/0140862 | A1 | 6/2007 | Mcmillan |
| 2007/0171257 | A1 | 7/2007 | Yang |
| 2007/0184238 | A1 | 8/2007 | Hockaday et al. |
| 2008/0196430 | A1 | 8/2008 | Mcgill et al. |

| | | | |
|---|---|---|---|
| 2008/0236668 | A1 | 10/2008 | Beerling et al. |
| 2008/0302024 | A1 | 12/2008 | Browne et al. |
| 2010/0028205 | A1 | 2/2010 | Ponjee et al. |
| 2010/0304063 | A1 | 12/2010 | Mccrea et al. |
| 2011/0284645 | A1 | 11/2011 | Tiliakos et al. |
| 2012/0255278 | A1 | 10/2012 | Miao et al. |
| 2013/0048135 | A1 | 2/2013 | Blumenthal et al. |
| 2013/0255796 | A1 | 10/2013 | Dimascio et al. |
| 2013/0255815 | A1 | 10/2013 | Brinkmann et al. |
| 2013/0287555 | A1* | 10/2013 | Rosen ................. F04D 29/0513 415/182.1 |
| 2014/0186161 | A1 | 7/2014 | Colson et al. |
| 2015/0033730 | A1 | 2/2015 | Beers et al. |
| 2015/0239046 | A1 | 8/2015 | Mcmahan et al. |
| 2016/0025078 | A1 | 1/2016 | Li et al. |
| 2016/0160353 | A1 | 6/2016 | Miarecki et al. |
| 2016/0160869 | A1 | 6/2016 | Roach et al. |
| 2016/0186575 | A1 | 6/2016 | Lacy et al. |
| 2017/0001263 | A1 | 1/2017 | Steiner |
| 2017/0227019 | A1 | 8/2017 | Chen et al. |
| 2018/0038513 | A1 | 2/2018 | Baldea et al. |
| 2018/0043660 | A1 | 2/2018 | Kang et al. |
| 2018/0058429 | A1 | 3/2018 | Kwon et al. |
| 2019/0203039 | A1 | 7/2019 | Seo et al. |
| 2019/0210111 | A1* | 7/2019 | Army ..................... B33Y 80/00 |
| 2020/0009826 | A1 | 1/2020 | Brown et al. |
| 2020/0316684 | A1 | 10/2020 | Shuck |
| 2021/0020263 | A1 | 1/2021 | Pasini et al. |
| 2021/0071020 | A1 | 3/2021 | Hu |
| 2021/0085856 | A1 | 3/2021 | Ding |
| 2021/0229350 | A1 | 7/2021 | Chaffins et al. |
| 2021/0238748 | A1 | 8/2021 | Andreatta |
| 2021/0277937 | A1 | 9/2021 | Elbibary et al. |
| 2021/0372286 | A1 | 12/2021 | Chakrabarti et al. |
| 2022/0034592 | A1 | 2/2022 | Maynard et al. |
| 2022/0089799 | A1 | 3/2022 | Wang et al. |
| 2023/0080512 | A1 | 3/2023 | Merritt et al. |
| 2023/0085189 | A1 | 3/2023 | Merritt et al. |
| 2023/0142146 | A1 | 5/2023 | Kilchyk |
| 2023/0227680 | A1 | 7/2023 | Hu |
| 2023/0304506 | A1 | 9/2023 | Kilchyk et al. |
| 2025/0033270 | A1 | 1/2025 | Merritt et al. |
| 2025/0033271 | A1 | 1/2025 | Merritt et al. |
| 2025/0033272 | A1 | 1/2025 | Merritt et al. |
| 2025/0033283 | A1 | 1/2025 | Merritt et al. |
| 2025/0033796 | A1 | 1/2025 | Merritt et al. |
| 2025/0083795 | A1 | 3/2025 | Kilchyk et al. |
| 2025/0084766 | A1 | 3/2025 | Kilchyk et al. |
| 2025/0084833 | A1 | 3/2025 | Kilchyk et al. |
| 2025/0084834 | A1 | 3/2025 | Kilchyk et al. |
| 2025/0084859 | A1 | 3/2025 | Kilchyk et al. |
| 2025/0085725 | A1 | 3/2025 | Kilchyk et al. |
| 2025/0088125 | A1 | 3/2025 | Kilchyk et al. |
| 2025/0089567 | A1 | 3/2025 | Kilchyk et al. |
| 2025/0089568 | A1 | 3/2025 | Kilchyk et al. |

FOREIGN PATENT DOCUMENTS

| | | | |
|---|---|---|---|
| DE | 102014225229 | A1 | 6/2016 |
| EP | 2025777 | A2 | 2/2009 |
| EP | 2974954 | A1 | 1/2016 |
| EP | 2960497 | B1 | 12/2016 |
| EP | 4177440 | A1 | 5/2023 |
| EP | 4209681 | A1 | 7/2023 |
| EP | 4219959 | A2 | 8/2023 |
| EP | 4411108 | A2 | 8/2024 |
| GB | 2472053 | A | 1/2011 |
| JP | 2007023361 | A | 2/2007 |
| JP | 2011148037 | A | 8/2011 |
| JP | 2022121766 | A | 8/2022 |
| KR | 20130005989 | A | 1/2013 |
| WO | 2015006438 | A1 | 1/2015 |
| WO | 2018108908 | A1 | 6/2018 |

(56) References Cited

FOREIGN PATENT DOCUMENTS

| | | |
|---|---|---|
| WO | 2019108203 A1 | 6/2019 |
| WO | 2019162754 A1 | 8/2019 |

OTHER PUBLICATIONS

Extended European Search Report for EP Application No. 24196240.6, dated Apr. 28, 2025, pp. 1-13.

Giani et al., "Towards sustainability in 3D printing of thermoplastic composites: Evaluation of recycled carbon fibers as reinforcing agent for FDM filament production and 3D printing", Composites: Part A 159, 2002, pp. 1-12.

Lazarus et al., "Direct electroless plating of conductive thermoplastics for selective metallization of 3D printed parts", Additive Manufacturing, vol. 55, Mar. 30, 2022, pp. 1-11.

Tammaro et al., "Reinforcing Efficiency of Recycled Carbon Fiber PLA Filament Suitable for Additive Manufacturing", Polymers 2024, pp. 1-17.

European Search Report for Application No. 24188681.1, mailed Dec. 4, 2024, 10 pages.

European Search Report for Application No. 24188696.9, mailed Dec. 16, 2024, 8 pages.

European Search Report for Application No. 24188713.2, mailed Jan. 2, 2025, 6 pages.

European Search Report for Application No. 24188714.0, mailed Dec. 13, 2024, 10 pages.

European Search Report for Application No. 24196227.3, mailed Oct. 31, 2024, 10 pages.

European Search Report for Application No. 24196233.1, mailed Oct. 31, 2024, 10 pages.

European Search Report for Application No. 24198989.6, mailed Nov. 4, 2024, 11 pages.

Kim, Daejong, "Parametric Studies on Static and Dynamic Performance of Air Foil Bearings with Different Top Foil Geometries and Bump Stiffness Distributions", https://doi.org/10.1115/1.2540065; Published Online: Nov. 15, 2006, 9 pages.

Lim, Teik-Cheng "Metamaterial with sign-toggling thermal expansivity inspired by Islamic motifs in Spain", Journal of Science: Advanced Materials and Devices, vol. 7, No. 1, Mar. 2022, 6 pages.

Micalizz, et al., "Shape-memory actuators manufacturing by dual extrusion multimaterial 3d printing of conductive and non-conductive filaments", Smart Mater. Struct. 28, 2019, pp. 1-13.

Schmiedeke, et al. "Experimental Investigation of Two Switching States of an Active Foil Bearing during Start-Up", Machines 2022, Published Jun. 6, 2022, 18 pages.

Wei, et al., "An overview of laser-based multiple metallic material additive manufacturing: from macro-to micro-scales", International Journal of Extrem. Manuf. 3 (2021), pp. 1-33.

Markforged "Onyx FR-A and Carbon Fiber FR-A: Aerospace-Ready Materials", markforged.com, Jul. 26, 2021, pp. 1-6.

Noughabi et al., "Detailed Design and Aerodynamic Performance Analysis of a Radial-Inflow Turbine", Applied Sciences, 2018, pp. 1-21.

Pearson et al., "Novel polyurethane elastomeric composites reinforced with alumina, aramid, and poly (p-phenylene-2, 6-benzobisoxazole) short fibers, development and characterization of the thermal and dynamic mechanical properties", Composites Part B: Engineering 122 (2017): 192-201.

Zhan et al., "Metal-plastic hybrid 3D printing using catalyst-loaded filament and electroless plating", Additive Manufacturing, 2020, pp. 1-7.

Zhiguo et al., "Determination of thermal expansion coefficients for unidirectional fiber-reinforced composites", Chinese Journal of Aeronautics, 2014, pp. 1-14.

Doering et al., "Micromachined thermoelectrically driven cantilever structures for fluid jet deflection" [1992] Proceedings IEEE Micro Electro Mechanical Systems. IEEE, (Feb. 1992) pp. 12-18.

European Search Report for Application No. 24190738.5, mailed Jan. 13, 2025, 8 pages.

European Search Report for Application No. 24196219.0, mailed Jan. 13, 2025, 8 pages.

European Search Report for Application No. 24196295.0, mailed Jan. 29, 2025, 16 pages.

European Search Report for Application No. 24196309.9, mailed Jan. 28, 2025, 10 pages.

European Search Report for Application No. 24199023.3, mailed Feb. 21, 2025, 15 pages.

European Search Report for Application No. 24199038.1, mailed Jan. 31, 2025, 8 pages.

European Search Report for Application No. 24199041.5, mailed Jan. 28, 2025, 8 pages.

Jerman "Electrically-activated, micromachined diaphragm valves" IEEE 4th Technical Digest on Solid-State Sensor and Actuator Workshop, Hilton Head, SC, USA, (Jun. 1990) pp. 65-69.

Jerman et al., "Electrically activated normally closed diaphragm valves" Journal of Micromechanics and Microengineering 4.4 (Dec. 1994) pp. 210-216.

Partial European Search Report for Application No. 24196240.6, mailed Feb. 7, 2025, 16 pages.

Richardson,, "The aerospace secret standard", Apr. 12, 2019, Aerospace Manufacturing, www.aero-mag.com/the-aerospace-secret-standard; 8 pages.

Hao et al., "A Review of Smart Materials for the Boost of Soft Actuators, Soft Sensors, and Robotics Applications", Chinese Journal of Mechanical Engineering, 2022, pp. 1-16.

* cited by examiner

24

10

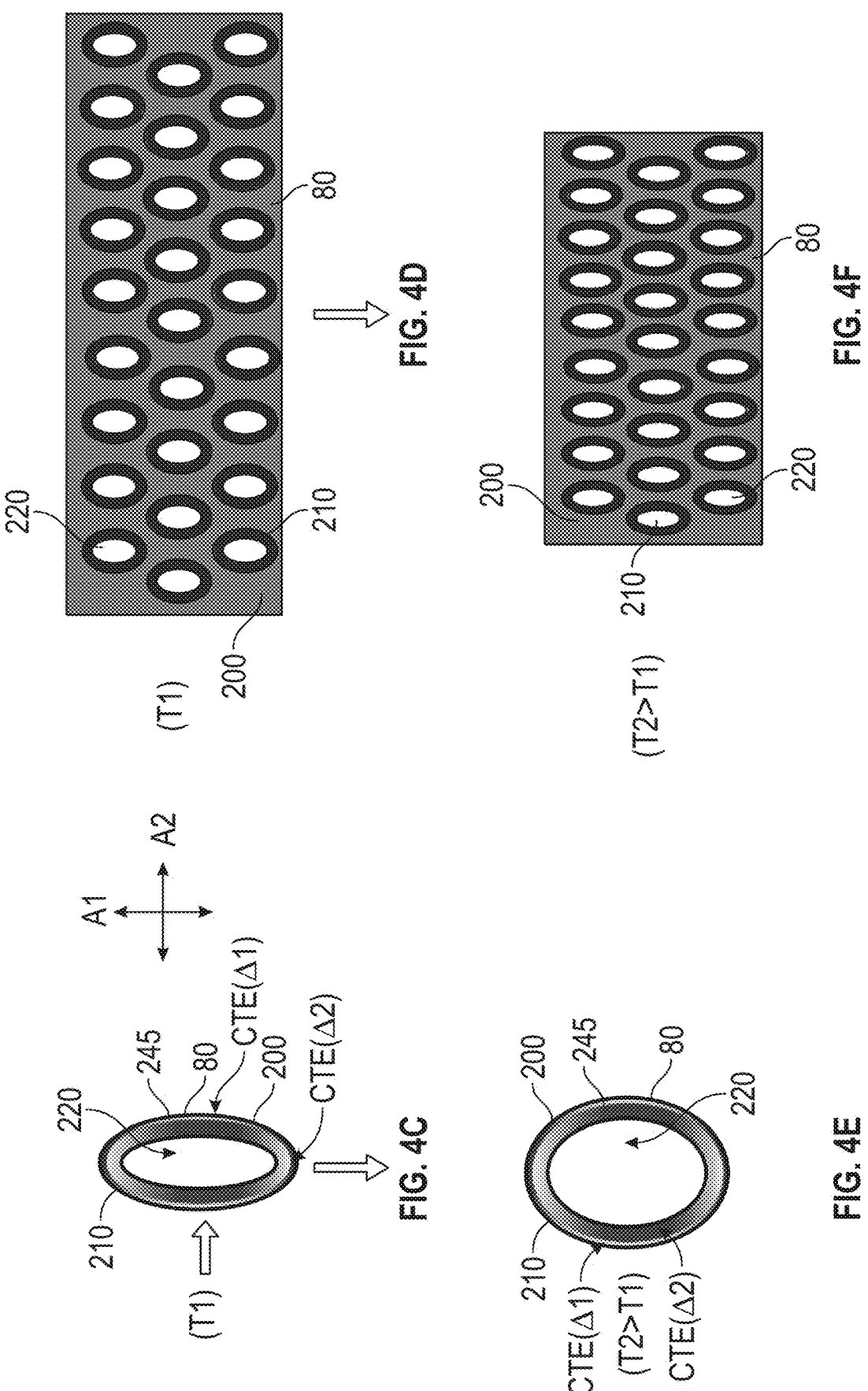

248

(T1)

200

210

248

(T2>T1)

200

210

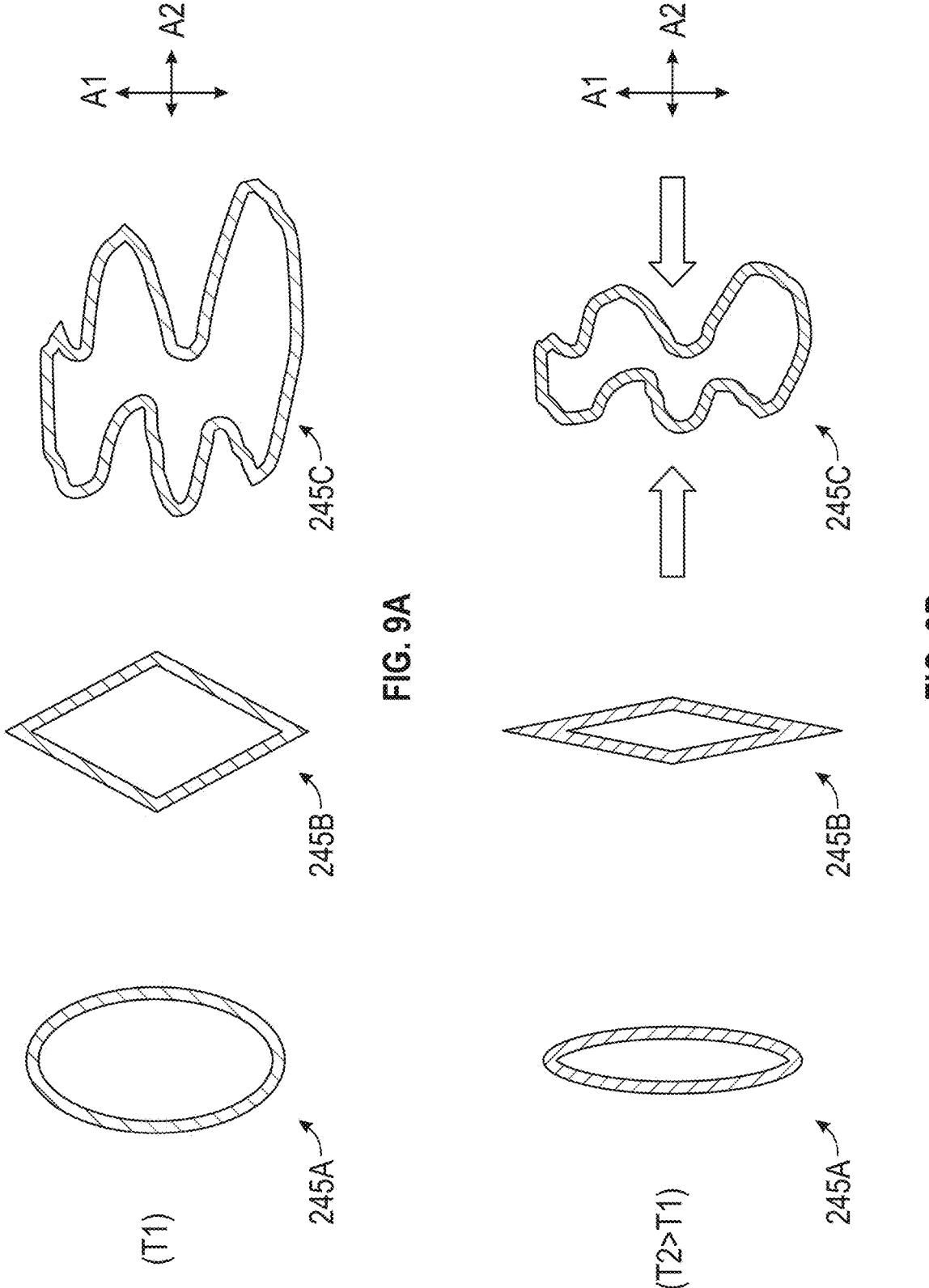

Start

┌─────────────────────────────────────────────────────────┐ ⌐100
│ Forming a shroud base having a plurality of discrete      │
│ sections including: a first section defining connecting   │
│ features for connecting with a fixed structure of the ACM;│
│ a second section that is positioned adjacent to a         │
│ compressor rotor when installed in the ACM; and           │
│ a third section that is disposed adjacent to a drive ring │
│ bearing when installed in the ACM, wherein forming the    │
│ shroud base includes:                                     │
│ Printing, layer by layer, the base of the shroud,         │
│ by printing first and second thermoplastic polymers       │
│ surfaces, respectively from first and second thermoplastic│
│ polymers, that are disposed against each other,           │
│ the first thermoplastic polymer surface having a first    │
│ coefficient of thermal expansion (CTE), and the second    │
│ thermoplastic polymer surface having a second CTE         │
└─────────────────────────────────────────────────────────┘

┌─────────────────────────────────────────────────────────┐ ⌐120
│ Forming a lower support section on the shroud base        │
│ by printing, layer by layer, along the plurality of discrete│
│ sections of the shroud base a mixture of a third          │
│ thermoplastic polymer and a catalyst formed with metal    │
└─────────────────────────────────────────────────────────┘

┌─────────────────────────────────────────────────────────┐ ⌐130
│ Forming an upper support section on the shroud by         │
│ depositing on the lower support section, along each of    │
│ the discrete sections, via electrolysis deposition,       │
│ a metallic coating, to thereby control thermal expansion  │
│ and contraction of the shroud along the discrete sections,│
│ to thereby make the shroud                                │
└─────────────────────────────────────────────────────────┘

End

FIG. 10A

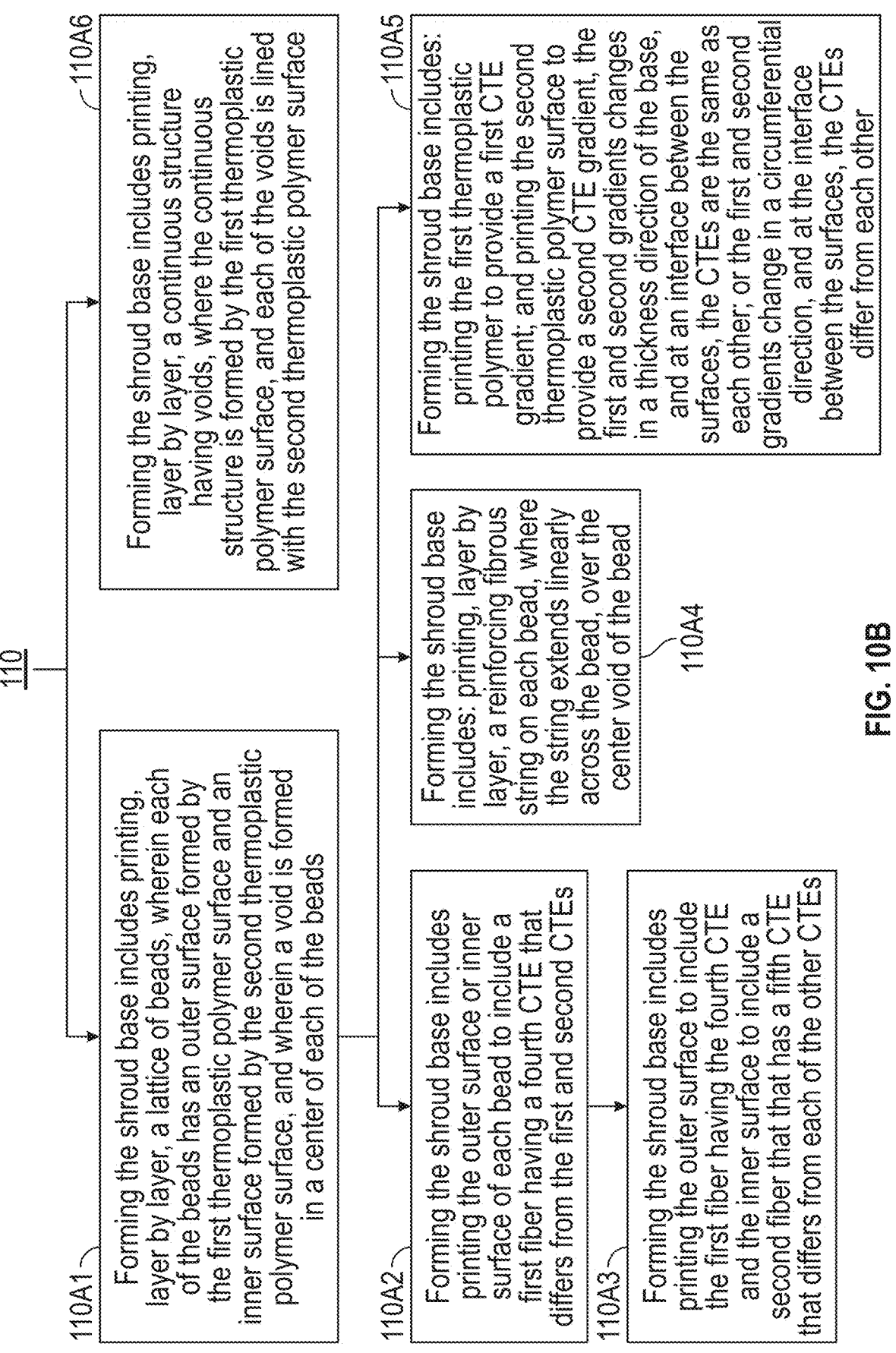

110

110A1

Forming the shroud base includes printing, layer by layer, a lattice of beads, wherein each of the beads has an outer surface formed by the first thermoplastic polymer surface and an inner surface formed by the second thermoplastic polymer surface, and wherein a void is formed in a center of each of the beads

110A2

Forming the shroud base includes printing the outer surface or inner surface of each bead to include a first fiber having a fourth CTE that differs from the first and second CTEs

110A3

Forming the shroud base includes printing the outer surface to include the first fiber having the fourth CTE and the inner surface to include a second fiber that that has a fifth CTE that differs from each of the other CTEs

110A4

Forming the shroud base includes: printing, layer by layer, a reinforcing fibrous string on each bead, where the string extends linearly across the bead, over the center void of the bead

110A6

Forming the shroud base includes printing, layer by layer, a continuous structure having voids, where the continuous structure is formed by the first thermoplastic polymer surface, and each of the voids is lined with the second thermoplastic polymer surface

110A5

Forming the shroud base includes: printing the first thermoplastic polymer to provide a first CTE gradient; and printing the second thermoplastic polymer surface to provide a second CTE gradient, the first and second gradients changes in a thickness direction of the base, and at an interface between the surfaces, the CTEs are the same as each other, or the first and second gradients change in a circumferential direction, and at the interface between the surfaces, the CTEs differ from each other

FIG. 10B

METAL PLATED ADDITIVELY MANUFACTURED PLASTIC ACM SHROUDS WITH INTERNAL THERMALLY ADAPTIVE STRUCTURE

BACKGROUND

The embodiments are directed to shrouds for an air cycle machine (ACM) and more specifically to a metal plated additively manufactured plastic shroud for an ACM with an internal thermally adaptive structure.

Shrouds manufactured using exotic materials may be expensive and heavy. Shrouds may be additively manufactured from plastic and coated with strengthening materials. However due to different coefficients of expansion, the different materials may separate or fail.

BRIEF DESCRIPTION

Disclosed is a method of forming a shroud for an air cycle machine (ACM), the method including: forming a shroud base having a plurality of discrete sections including: a first section defining connecting features for connecting with a fixed structure of the ACM; a second section that is positioned adjacent to a compressor rotor when installed in the ACM; and a third section that is disposed adjacent to a drive ring bearing when installed in the ACM, wherein forming the shroud base includes: printing, layer by layer, the shroud base, by printing first and second thermoplastic polymer surfaces, respectively from first and second thermoplastic polymers, that are disposed against each other, the first thermoplastic polymer surface having a first coefficient of thermal expansion (CTE), and the second thermoplastic polymer surface having a second CTE; forming a lower support section on the shroud base by printing, layer by layer, along the plurality of discrete sections of the shroud base a mixture of a third thermoplastic polymer and a catalyst formed with metal; and forming an upper support section on the shroud by depositing on the lower support section, along each of the discrete sections, via electrolysis deposition, a metallic coating, to thereby control thermal expansion and contraction of the shroud along the discrete sections, to thereby make the shroud.

In addition to one or more aspects of the method, or as an alternative, the first and second CTEs differ from each other.

In addition to one or more aspects of the method, or as an alternative, forming the shroud base includes printing, layer by layer, a lattice of beads, wherein the each of the beads has an outer surface formed by the first thermoplastic polymer surface and an inner surface formed by the second thermoplastic polymer surface, and wherein a void is formed in a center of each of the beads.

In addition to one or more aspects of the method, or as an alternative, the outer surface has first thickness and the inner surface has a second thickness that is greater than the first thickness.

In addition to one or more aspects of the method, or as an alternative, forming the shroud base includes printing the outer surface or the inner surface of each bead to include a first fiber having a fourth CTE that differs from the first and second CTEs.

In addition to one or more aspects of the method, or as an alternative, forming the shroud base includes printing the outer surface to include the first fiber having the fourth CTE and the inner surface to include a second fiber that that has a fifth CTE that differs from each of the other CTEs.

In addition to one or more aspects of the method, or as an alternative, the CTEs, other than the fourth and fifth CTEs, are the same as each other.

In addition to one or more aspects of the method, or as an alternative, the first fiber and the second fiber differ from each other, each being one of metallic, carbon or Kevlar fibers.

In addition to one or more aspects of the method, or as an alternative, forming the shroud base includes printing, layer by layer, a reinforcing fibrous string on each bead, wherein the string extends linearly across the bead, over the void of the bead.

In addition to one or more aspects of the method, or as an alternative, forming the shroud base includes: printing the first thermoplastic polymer surface to provide a first CTE gradient; and printing the second thermoplastic polymer surface to provide a second CTE gradient.

In addition to one or more aspects of the method, or as an alternative, the first and second gradients change in a thickness direction of the shroud base, and at an interface between the first and second thermoplastic polymer surfaces, the CTEs are the same as each other; or the first and second gradients change in a circumferential direction, and at the interface between the first and second thermoplastic polymer surfaces, the CTEs differ from each other.

In addition to one or more aspects of the method, or as an alternative, forming the shroud base includes printing, layer by layer, a continuous structure having voids, where the continuous structure is formed by the first thermoplastic polymer surface, and each of the voids is lined with the second thermoplastic polymer surface.

In addition to one or more aspects of the method, or as an alternative, the first and second thermoplastic polymer surfaces are the same as each other.

In addition to one or more aspects of the method, or as an alternative, the first thermoplastic polymer surface is Acrylonitrile butadiene styrene (ABS).

In addition to one or more aspects of the method, or as an alternative, the catalyst is palladium (II) chloride ($PdCl_2$).

In addition to one or more aspects of the method, or as an alternative, the method includes utilizing stereolithography (SLA) or fused deposition modeling (FDM).

Disclosed is an air cycle machine of an aircraft, including: a rotor shroud manufactured from a method having one or more of the above disclosed aspects; the fixed structure that is connected to the first section of the shroud; the compressor rotor disposed adjacent to the second section of the shroud; and the drive ring bearing disposed adjacent to the third section of the shroud.

BRIEF DESCRIPTION OF THE DRAWINGS

The following descriptions should not be considered limiting in any way. With reference to the accompanying drawings, like elements are numbered alike:

FIG. 4C shows a bead, with the two thermoplastic polymer surfaces having CTE gradients that are different from each other at their interface and each one changes in the hoop or circumferential direction, at a temperature T1; FIG. 4D shows the block at a temperature T1;

FIG. 4E shows the bead of FIG. 4C at a temperature T2>T1;

FIG. 4F shows the block of FIG. 4D at a temperature T2>T2;

FIG. 9A shows beads of various shapes at a temperature T1;

FIG. 9B shows the structures of FIG. 9A at a temperature T2>T1;

FIG. 10A is a flowchart showing a method of manufacturing a shroud according to the embodiments; and FIG. 10B is another flowchart showing the method of manufacturing a shroud according to the embodiments.

DETAILED DESCRIPTION

A detailed description of one or more embodiments of the disclosed apparatus and method are presented herein by way of exemplification and not limitation with reference to the Figures.

Figure 1:
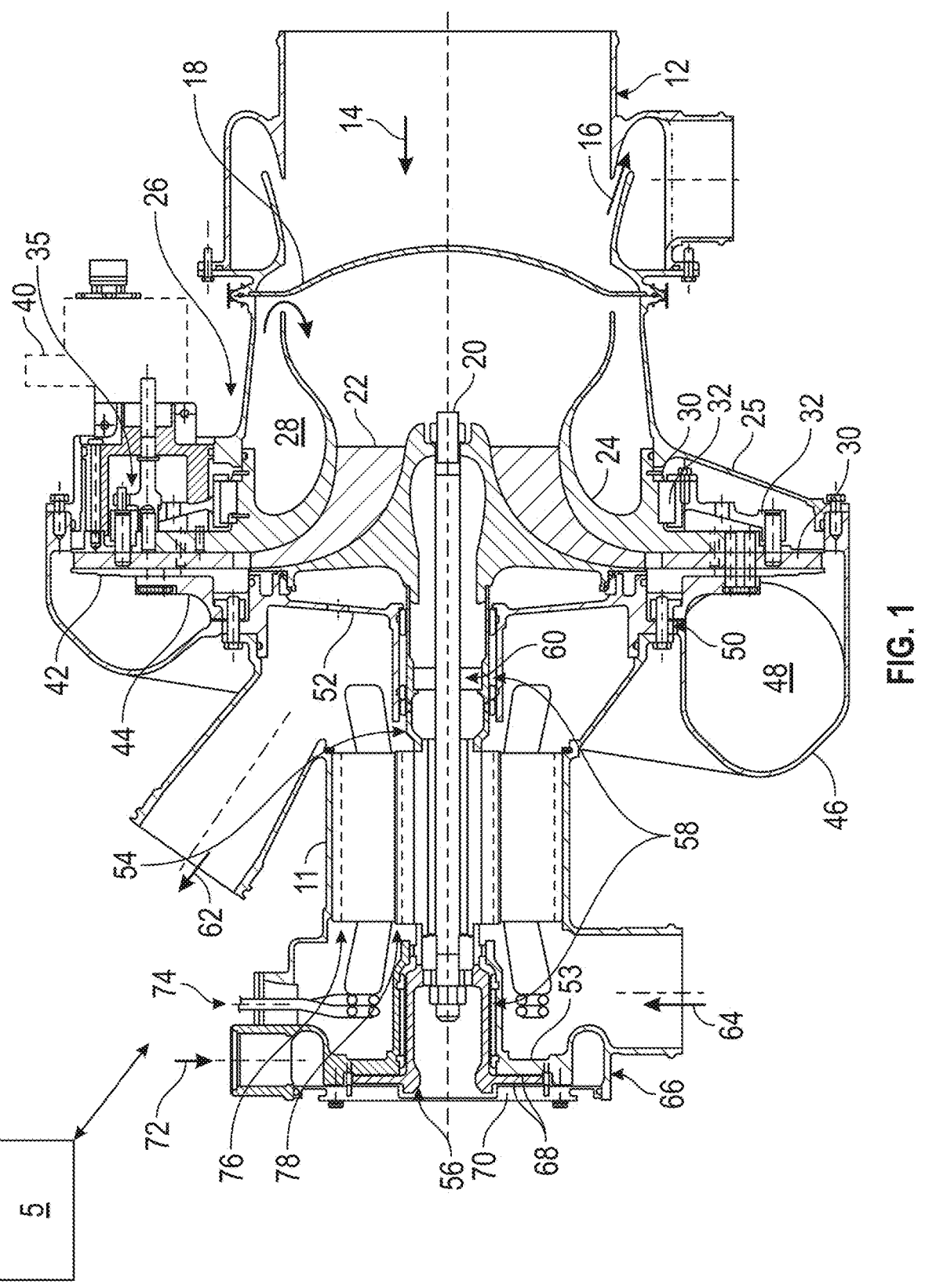
FIG. 1 shows an air cycle machine (ACM) according to an embodiment.

FIG. 1 shows an air cycle machine (ACM) 10 of an aircraft 5 (shown schematically). The ACM 10 may include an outer case 11 that has an inlet housing 12 of a compressor inlet 14, and a motor cooling supply port 16. Downstream of the inlet housing 12 is a FOD screen 18. A tie rod 20 is surrounded by a compressor rotor 22. A diffusor rotor shroud (or shroud) 24 and an add heat housing 26 surround an add heat supply 28. The add heat housing 26 is connected to the outer case 11 via a forward frame member 25. Exterior to the add heat housing 26 is a backup ring 30 supporting a drive ring bearing 32. The drive ring bearing 32 is structurally coupled to a drive ring 34 and pinion 35. The ACM 10 includes a diffuser vane 36 and a variable diffusor actuator 40. Downstream of the compressor rotor 22 is an inboard plate 42 structurally coupled to a backing plate 44. An outlet housing 46 defines a compressor outlet 48. The compressor outlet 48 is secured with a bolt ring 50 to an intermediate frame member 52 of the ACM case 11. A rotor shaft 54 and aft thrust bearing shaft 56 are supported by journal bearings and a sleeve 58. The journal bearing and sleeve 58 are supported by the case 11 via, e.g., the intermediate frame member 52 and an aft frame member 53. The tie rod 20 is supported over the rotor shaft 54 by a tie rod support 60. The ACM case 11 defines a bearing and motor cooling outlet 62. A motor cooling inlet 64 is defined at an aft motor housing 66. Surrounding the thrust shaft 56 are thrust bearings 68. A thrust plate 70 is located at the aft end of the ACM 10. The aft end of the ACM 10 also defines a bearing cooling inlet 72 and includes lead wires and a cover plate 74. Between the motor cooling inlet 64 and outlet 62 is a motor stator 76 and rotor 78.

Figures 2, 3:
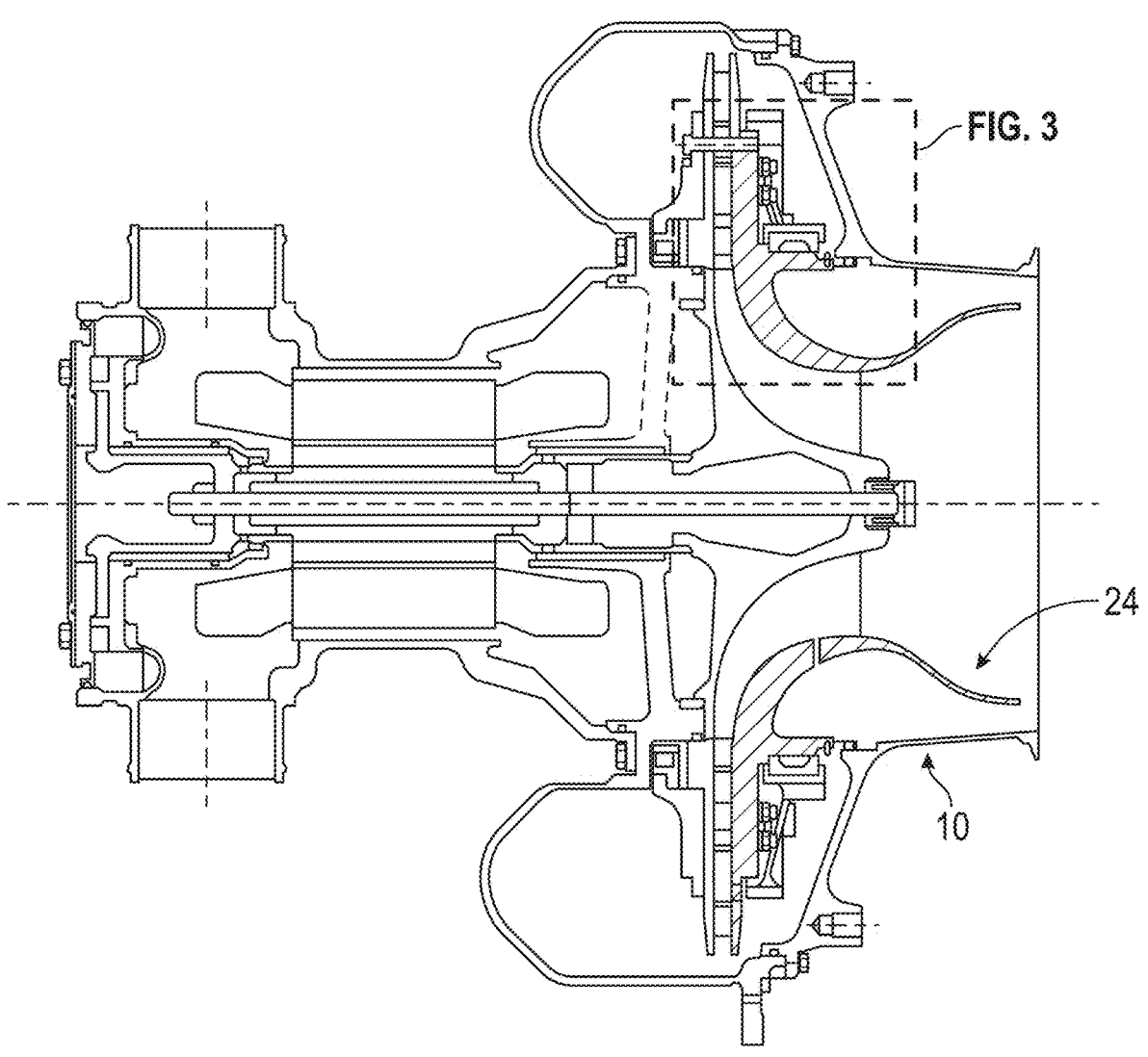
FIG. 2 shows a shroud of the ACM manufactured according to the embodiment.
FIG. 3 shows additional aspects of the shroud, including locations of increased thermal stress.
Figure 3:
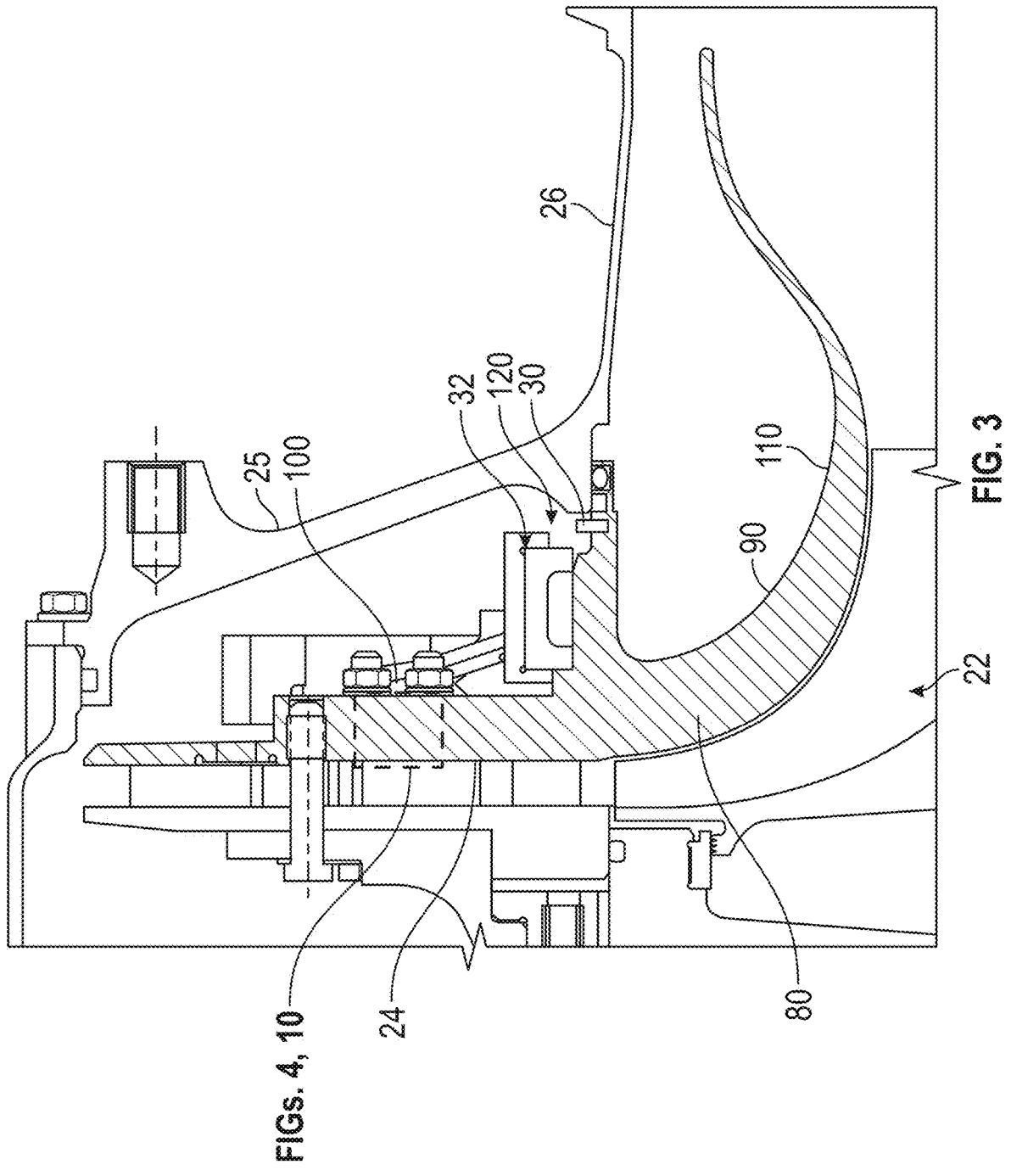

FIG. 2 shows the shroud 24 of the ACM 10 that is additively manufactured according to the disclosed embodiments. The additive manufacturing process may utilize stereolithography (SLA) or fused deposition modeling (FDM) as non-limiting examples, e.g., utilizing a multi-head 3D printer. FIG. 3 shows additional aspects of the shroud 24. The shroud 24 has a base 80, which forms the general shape of the shroud 24. The shroud base 80 has certain discrete sections (generally 90), that experience thermal stress in operation, including a first section 100 defining connecting features for connecting with a fixed structure, e.g., the forward frame member 25 of the ACM 10. A second section 110 is located adjacent to the compressor rotor 22 when installed in the ACM 10. A third section 120 is disposed adjacent to the drive ring bearing 32 when installed in the ACM 10.

As will be discussed in greater detail below, the shroud base 80 is manufactured of different thermoplastic polymers (plastics) having different coefficients of thermal expansion (CTE), and the discrete sections 90 are plated in metal. In a multi-head 3D printer, each print head could selectively print a different one of thermoplastic polymers and mixtures identified herein. Due to the utilization of the multiple plastics in the shroud base 80, the metal plating does not separate when the shroud 24 is subjected to thermal stress.

Figures 4A, 4B:
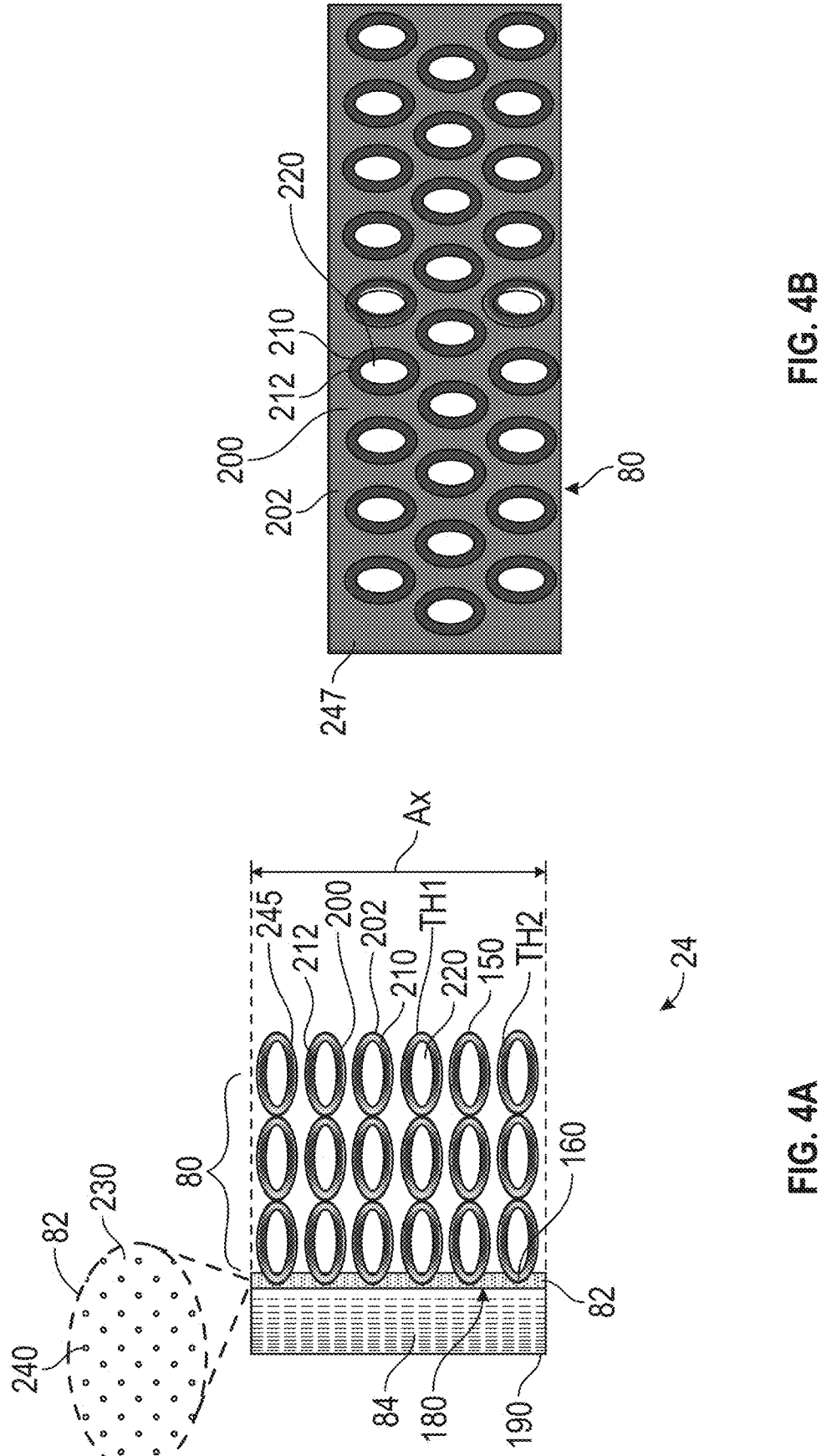
FIG. 4A shows aspects of the additively manufactured shroud base with a lattice of beads manufactured of multiple plastic extrusions or printings to enable controlling of thermal expansion of the shroud base.
FIG. 4B shows aspects of the additively manufactured shroud base with a block manufactured of multiple plastic extrusions or printings to enable controlling of thermal expansion of the shroud.

Turning to FIG. 4A, the shroud base 80 extends from a bottom 150 of the shroud 24 to a first intermediate location 160 in a thickness direction. A lower support section 82 is disposed over the shroud base 80 in the thickness direction. The lower support section 82 is located along the discrete sections 90 but not the remainder of the shroud base 80. The lower support section 82 extends from the first intermediate location 160 to a second intermediate location 180. An upper support section 84 is disposed over the lower support section 82. The upper support section 84 is also located along the discrete sections 90 but not the remainder of the shroud base 80. The upper support section 84 extends from the second intermediate location 180 to a top 190. The lower and upper support sections 82, 84 may be deposited over a discrete area Ax as indicated.

The shroud base 80 is formed by utilizing first and second thermoplastic polymers to respectively build up, layer by layer, first and second thermoplastic polymer surfaces 200, 210. That is, each of the first and second thermoplastic polymers surfaces 200, 210 is formed of one of the first and second thermoplastic polymers. The first and second thermoplastic polymers surfaces 200, 210 have differing CTEs. As disclosed in greater detail below, the first and second thermoplastic polymer surfaces 200, 210 are respectively configured as outer and inner surfaces 202, 212, and a void 220 is defined within the inner surface 212.

The lower support section 82 is a mixture of a third plastic 230 and a catalyst 240 compound that includes metal. The catalyst may be is palladium (II) chloride ($PdCl_2$). The upper supper section 84 is a metal plating that is formed via electrolysis deposition so that the plating may be Pd. In one embodiment, the first thermoplastic polymer surface 200 is acrylonitrile butadiene styrene (ABS). In one embodiment, the first and second thermoplastic polymer surfaces 200, 210 are the same as each other. In one embodiment, all of the utilized plastic in the shroud 24 be the same thermoplastic polymer, such as ABS.

As shown in FIG. 4A, the first and second thermoplastic polymer surfaces 200, 210 in the shroud base 80 may be formed as lattice of interconnected beads 245 that have an oval shape. The beads 245 are micro-pattern elements. The first thermoplastic polymer surface 200 may form the outer bead surface 202 and the second thermoplastic polymer surface 210 may form the inner bead surface 212. The void 220 is located in the center of each bead 245. The outer surface 202 has first thickness TH1 and the inner surface 212 has a second thickness TH2 that is greater than the first thickness TH1.

Alternatively, as shown in FIG. 4B, the first thermoplastic polymer surface 200 of the shroud base 80 may form a continuous block 247 as the outer surface 202. The block 247 is formed with voids 220 that are lined with the second thermoplastic polymer surface 210 as the inner surface 212.

The resulting configuration is capable of controlling thermal expansion and contraction of the shroud 24 along the discrete sections 90. As shown in FIGS. 4C and 4D at temperatures T1, and in FIGS. 4E and 4F at temperatures T2>T1, the shroud base 80 has a controlled thermal explanation due to different CTEs and formation of the first and second thermoplastic polymer surfaces 200, 210 in the shroud base 80. More specifically, regarding FIG. 4C, the bead 245 is shown in which both the first thermoplastic polymer surface 200 and second thermoplastic polymer surface 210, i.e., the outer and inner surfaces 202, 212, are also formed of CTEs that define gradients. The first thermoplastic polymer surface 200 has a first CTE gradient CTE($\Delta$1) and the second thermoplastic polymer surface 210 has a second CTE gradient CTE($\Delta$2). The gradients are formed such that they are different from each other at their interface 360 and each one changes in the hoop or circumferential direction. When the temperature is increased from T1 to T2, the resulting controlled bend of the shroud base 80 is shown in FIG. 9E. As shown, the bead has an oval or elliptical shape with a long and a narrow axis A1, A2, and, at temperature T2, the bead 245 becomes compressed along its narrow axis A2 due to the controlled deformation. In FIGS. 4C and 4E, the bead 245 is formed with a gradient of thermal expansion inside of the first and second thermoplastic polymer surfaces 200, 210, i.e., the outer and inner surfaces 202, 212, to control the effect of the temperature changes.

In one embodiment, the density of the beads 245 or size of the voids 220 in the beads 245 or the continuous block 247 at one or more of the discrete sections 90 may be adjusted when printing the base 20. This adjustment may change the density and thus thermal response characteristics of the base 80.

Figure 4G:
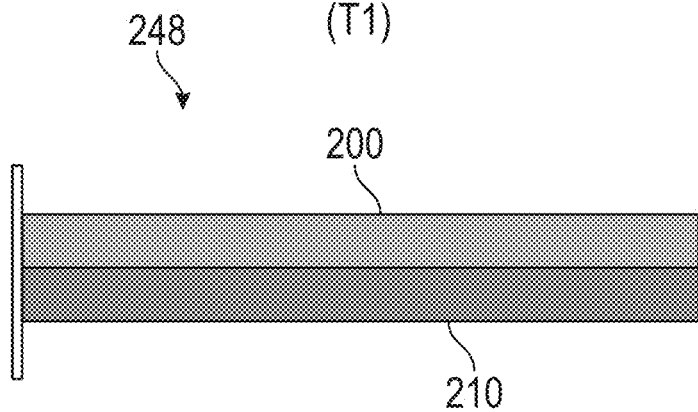
FIG. 4G shows an equivalent structure to the structures shown in FIGS. 4C-4F, with two thermoplastic polymer surfaces having different coefficients of thermal expansion (CTE), at a temperature T1.
Figure 4H:
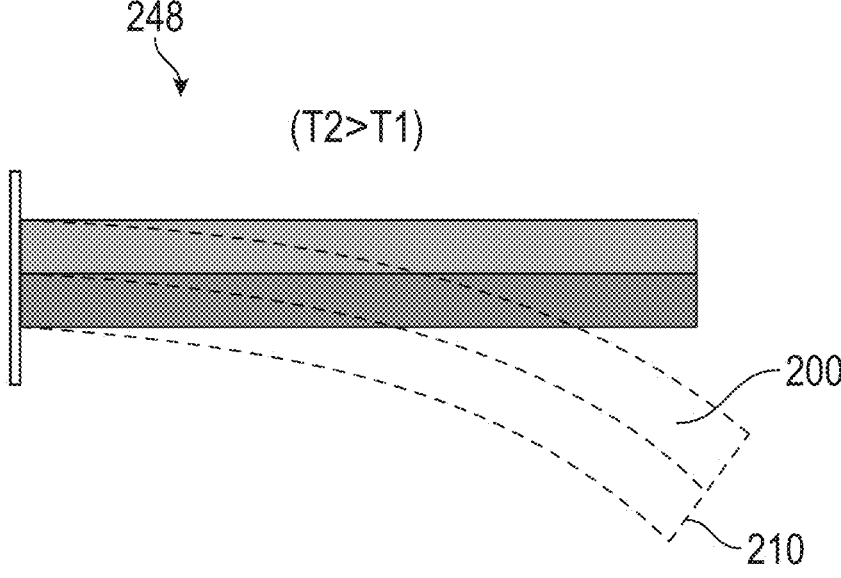
FIG. 4H shows the structure of FIG. 4G at a temperature T2>T1.

FIGS. 4G and 4H show an equivalent structure 248 to the structures shown in FIGS. 4C-4F. Specifically, the first and second thermoplastic polymer surfaces 200, 210 are at a temperature T1 in FIG. 4G, and T2 that is greater than T1 in FIG. 4H. The controlled thermal expansion shown in FIG. 4H results from the thermoplastic polymer surfaces being integrally connected. That is, the first and second thermoplastic polymer surfaces 200, 210 bend together in a predictable and controlled way. That is, the controlled thermal expansion of the first and second thermoplastic polymer surfaces 200, 210 in the disclose embodiments prevents the metal plating of the upper support section 84 from breaking off the shroud 24.

Thus, the embodiments provide a shroud 24 made of plastic, which results in a cost reduction compared with making the shroud 24 from more exotic materials. The shroud 24 is abrasion resistant, and is not prone to static electric charging. The shroud 24 is designed for optimizing thermal deflections, to reduce induced stress and weight, and increase performance. Different thermal expansion characteristics may be obtained using two different thermoplastic polymers in the additive manufacturing process. Alternatively, as discussed below, the same material may be utilized with fillings such as metallic, carbon, or Kevlar fibers in the additive manufacturing process.

Figure 5B:
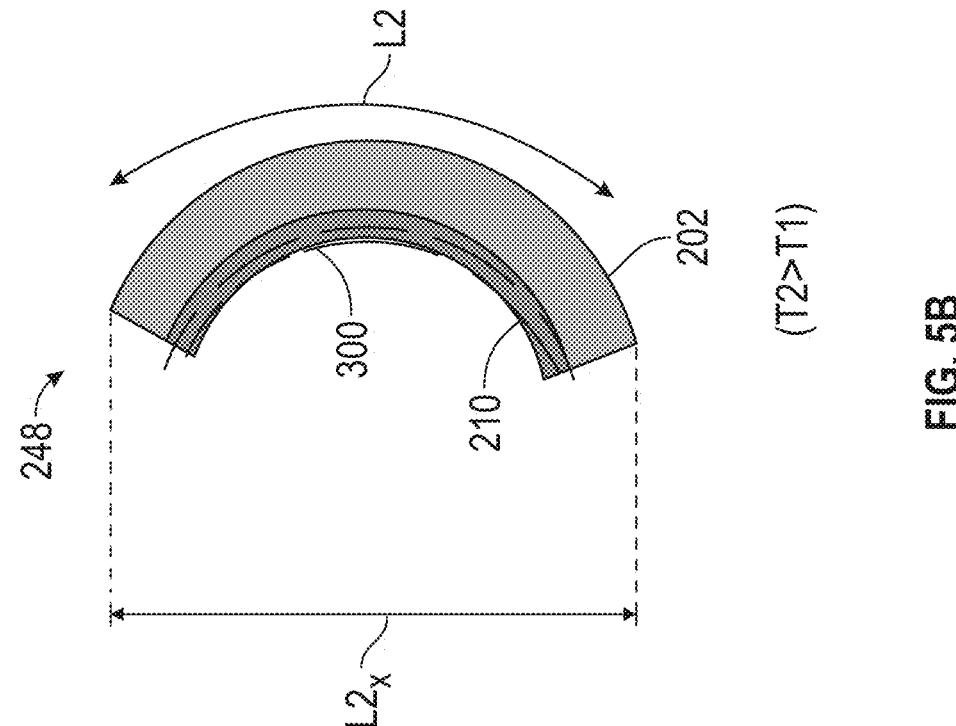
FIG. 5B shows the structure of FIG. 5A at a temperature T2>T1.
Figure 5A:
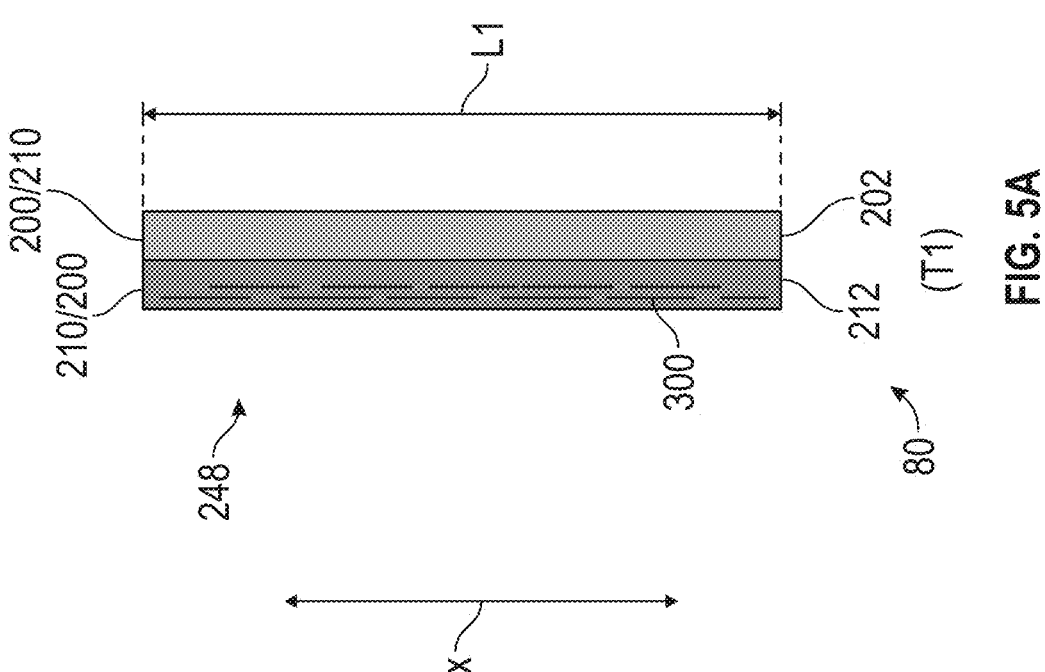
FIG. 5A shows an equivalent structure to the structures shown in FIGS. 4C-4F, with fibers in one of the two thermoplastic polymer surfaces, at a temperature T1.

FIGS. 5A and 5B also show an equivalent structure 248 to the structures shown in FIGS. 4C-4F. First fibers 300 are embedded in the one of the first and second thermoplastic polymer surfaces 200 (or 210), i.e., in one of the outer and inner surfaces 202, 212 in the shroud base 80. The fibers 300 may have a fourth CTE which may differ from the first and second CTEs of the first and second thermoplastic polymer surfaces 200, 210.

FIG. 5A shows the shroud base 80 at temperature T1. FIG. 5B shows the controlled bend of the shroud base 80 when the temperature is increased from T1 to T2. As shown, at temperature T1, the structure 248 has a length L1 and at temperature T2, the structure 248 has a length L2 due to the controlled deformation. With increasing temperature, material volute increases. However, if the additively reinforcing fiber 300 has a lower CTE, the expansion is restricted. Having this reinforcement non-uniformly distributed, may result in the non-uniform expansion and thus curvature or curvature change in shape. Therefore, while an expanded length would otherwise increase to L2 where L2>L1, due to the fibers 300, the length projected on the x axis (vertical) increase only to (L2x<L1). The surface having the larger CTE, e.g., without the fibers 300, would elongate, resulting in a curative increase.

Figure 6B:
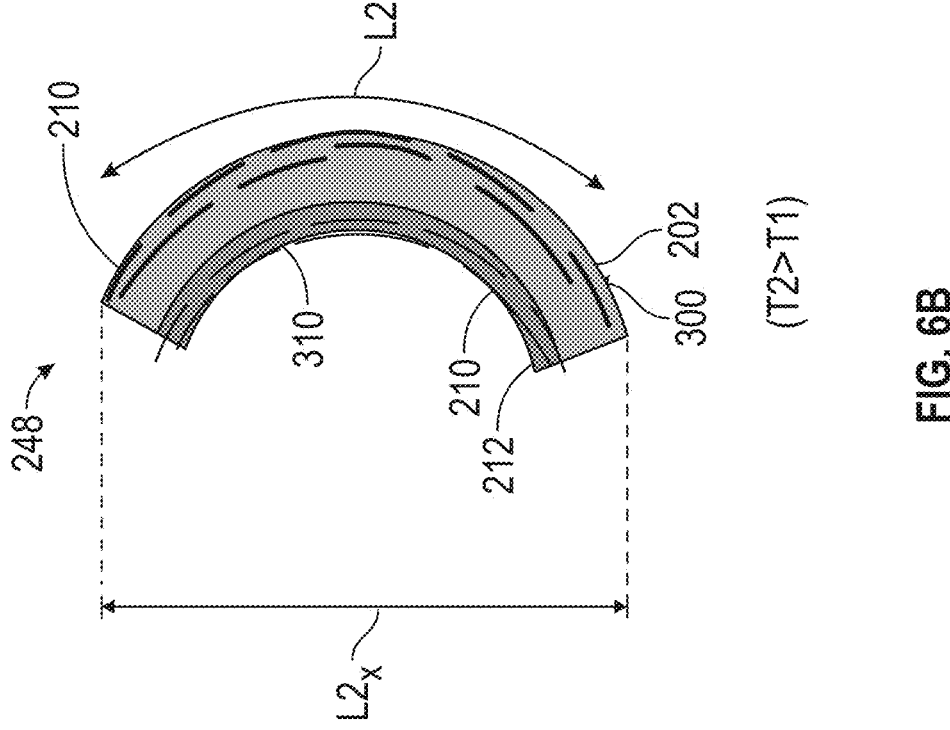
FIG. 6B shows the structure of FIG. 6A at a temperature T2>T1.
Figure 6A:
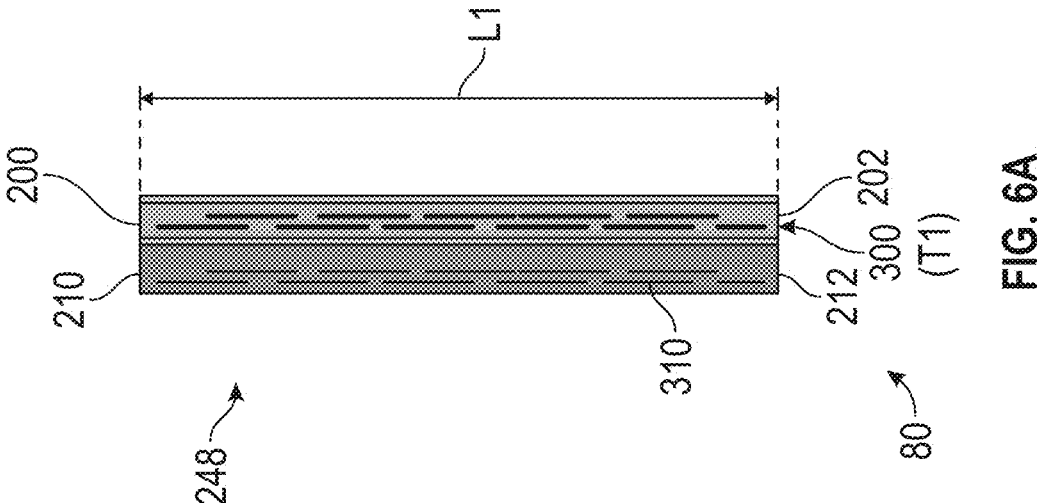
FIG. 6A shows an equivalent structure to the structures shown in FIGS. 4C-4F, with fibers in both of the thermoplastic polymer surfaces having different CTEs from each other, at a temperature T1.

FIGS. 6A and 6B show another equivalent structure 248 to the structures shown in FIGS. 4C-4F. The first fibers 300 embedded in the first thermoplastic polymer surface 200 i.e., the outer surface 202. Second fibers 310 are embedded in the second thermoplastic polymer surface 210, i.e., the inner surface 212. The second fibers 310 may have a fifth CTE which differs from each of the other CTEs. In one embodiment, the fourth and fifth CTEs differ from each other while the other CTEs are the same as each other.

When the temperature is increased from T1 to T2, the controlled bend of the shroud base 80 is shown in FIG. 6B. As shown, at temperature T1, the structure 248 has a length L1 and at temperature T2, the structure 248 has a length L2x rather than a more expanded length L2 due to the controlled deformation. In FIGS. 6A and 6B, the structure 248 has a variable composition with a gradient in the CTE that may be produced with a variation of the type of the reinforcing fiber 300, 310. This gradient is provided because each fiber 300, 310 would have different CTE. The fibers 300, 310 may be straight or twisted and may be metallic, carbon or Kevlar fibers. The fibers in each of the first and second thermoplastic polymer surfaces 200, 210, i.e., the outer and inner surfaces 202, 212, may be different from each other.

Figures 7A, 7B:
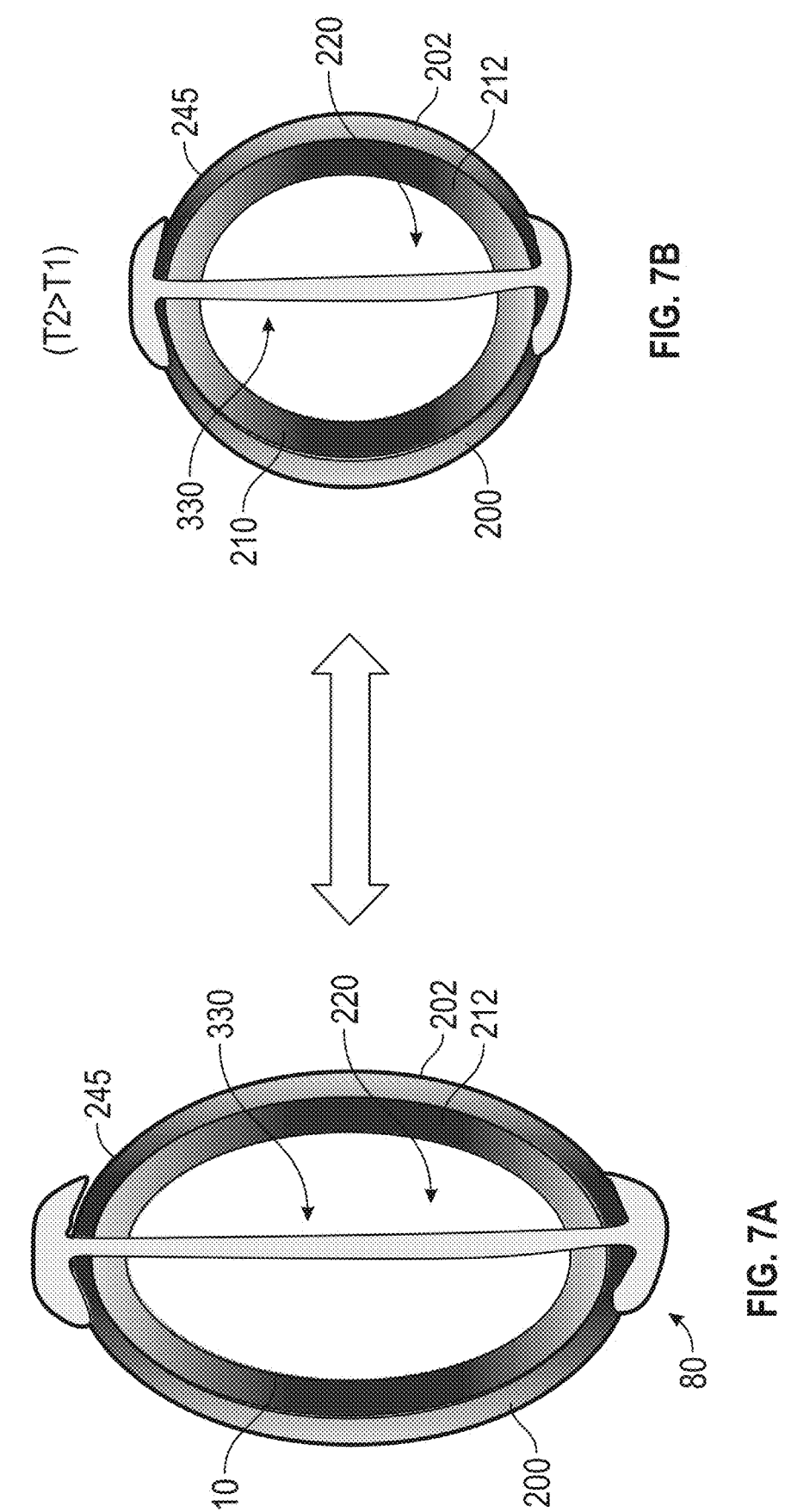
FIG. 7A shows a bead, with a fibrous string extending across the bead, at a temperature T1.
FIG. 7B shows the structure of FIG. 7A at a temperature T2>T1.

Turning to FIG. 7A, the bead 245 is shown with a fibrous string 330 that extends across the bead 245, over both thermoplastic polymer surfaces 200, 210, i.e., both of the outer and inner surfaces 202, 212, and the void 220. While FIG. 7A shows the bead 245 at temperature T1, FIG. 7B shows the bead 245 at temperature T2>T1. In FIG. 7B, the bead 245 displays a controlled change in shape due to the combination of material properties in the thermoplastic polymer surfaces 200, 210, i.e., the outer and inner surfaces 202, 212, and the fibrous string 330. The stiffness-increasing fibrous string may be additively manufactured with the rest of the shroud base 80.

Figure 8B:
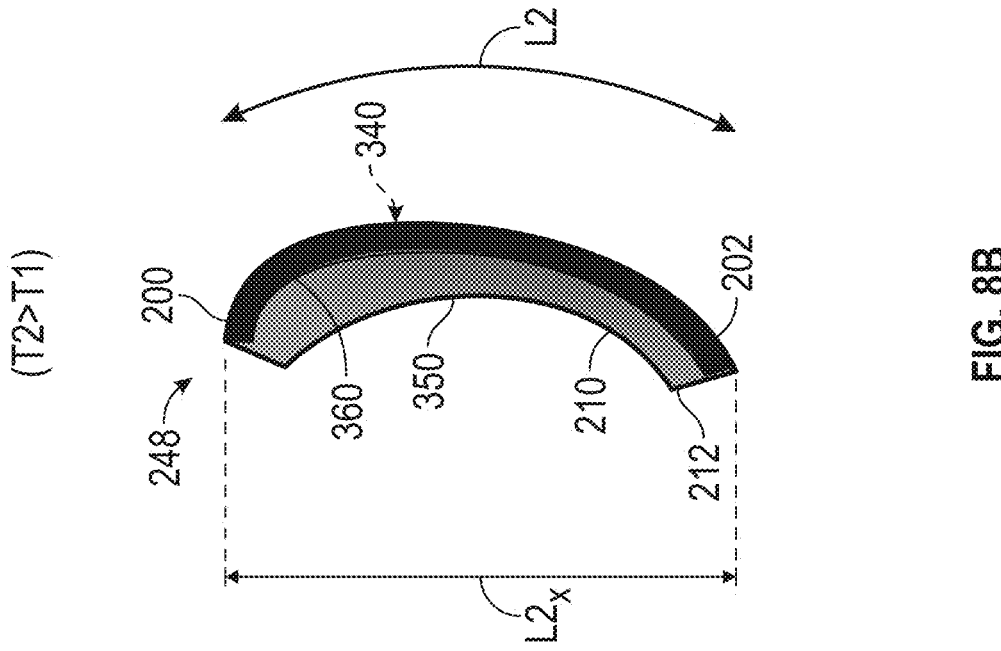
FIG. 8B shows the structure of FIG. 8A at a temperature T2>T1.
Figure 8A:
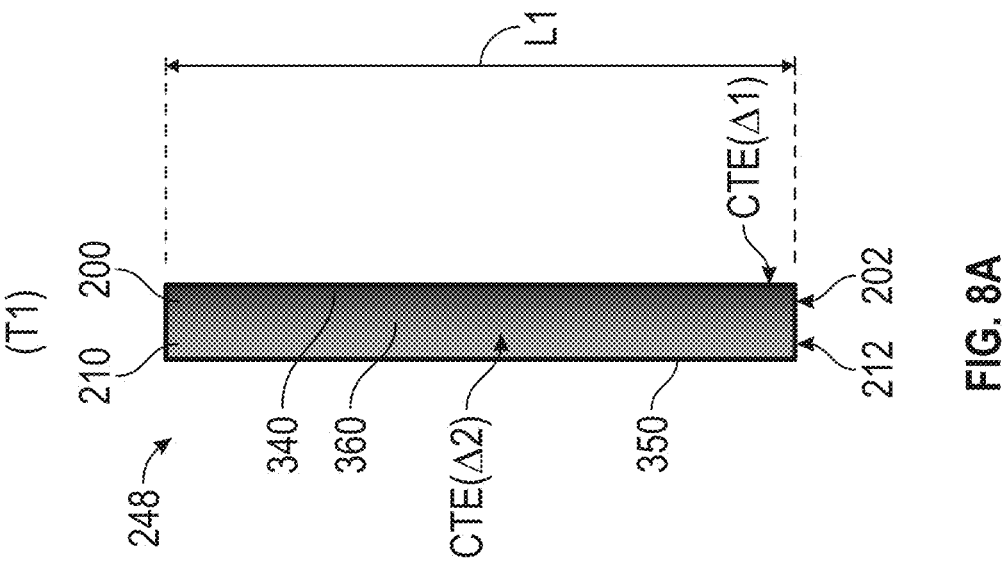
FIG. 8A shows an equivalent structure to the structures shown in FIGS. 4C-4F, with the two thermoplastic polymer surfaces having CTE gradients with a common value at an interface of the thermoplastic polymer surfaces and having different values away from the interface, at a temperature T1.

FIGS. 8Aa and 8B show an equivalent structure 248 to the structures shown in FIGS. 4C-4F. Both the first and second thermoplastic polymer surfaces 200, 210, i.e., the outer and inner surfaces 202, 212, are formed having CTEs that define gradients. The first thermoplastic polymer surface 200 has a first CTE gradient CTE(Δ1) and the second thermoplastic polymer surface 210 has a second CTE gradient CTE(Δ2). The gradients are formed such that they are different from each other at opposite ends 340, 350 of the structure (e.g., inside to outside) but are the same as each other at their interface 360. When the temperature is increased from T1 to T2, the controlled bend of the structure 248 is shown in FIG. 8B. As shown, at temperature T1, the structure 248 has a length L1 and at temperature T2, the structure 248 has a length L2x rather than the more expanded length L2 due to the controlled deformation. In FIGS. 8A and 8B, the variable CTE may be produced by gradually changing from the first to the second thermoplastic polymer surfaces 200, 210, i.e., during printing, between the outer and inner surfaces 202, 212. In this embodiment, as with each embodiment disclosed herein, the first and second thermoplastic polymer surfaces 200, 210 may have different rate of thermal expansion due to the different CTEs.

Turning to FIGS. 9A and 9B, various shapes of the beads 245 are within the scope of the embodiments, including oval 245A, diamond 245B and random closed loop 245C. Each is configured similar to FIG. 4C to provide for a deformation along a desired axis, for example, the narrow axis A2 rather than the long axis A1 when a temperature is increase from T1 (FIG. 9A) to T2 (FIG. 9B).

Turning to FIG. 10A a flowchart shows a process of manufacturing the shroud 24. As shown in block 110 the method includes forming the shroud base 80 having the plurality of discrete sections 90 including: a first section 100 defining connecting features for connecting with a fixed structure of the ACM; the second section 110 that is positioned adjacent to a compressor rotor when installed in the ACM; and the third section 120 that is disposed adjacent to the drive ring bearing 32 when installed in the ACM 10. Forming the shroud base 80 includes printing, layer by layer, the shroud base 80. This includes printing the first and second thermoplastic polymers surfaces 200, 210, respectively from first and second thermoplastic polymers, as separate surfaces that are disposed against each other. The first thermoplastic polymer surface 200 has a first coefficient of thermal expansion (CTE), and the second thermoplastic polymer surface 210 has a second CTE.

As shown in block 120, the method includes forming the lower support section 82 on the shroud base 80. This includes printing, layer by layer, along the plurality of discrete sections 90 of the shroud base 80, the mixture of the third thermoplastic polymer and the catalyst compound formed with metal.

As shown in block 130, the method includes forming the upper support section 84 on the shroud 24. This includes depositing on the lower support section 82, along each of the discrete sections 90, via electrolysis deposition, the metallic coating. This configuration controls thermal expansion and contraction of the shroud 24 along the discrete sections 90.

FIG. 10B shows additional aspects of block 110 of forming the shroud base 80. As shown in block 110A1 (and FIG. 4A), forming the shroud base 80 may include printing, layer by layer, the lattice of beads 245. Each of the beads 245 has the outer surface 202 formed by the first thermoplastic polymer surface 200 and the inner surface 212 formed by the second thermoplastic polymer surface 210. The void 220 is formed in the center of each of the beads 245.

As shown in block 110A2 (and FIGS. 5A-5B), forming the shroud base 80 may include printing the outer surface 202 or inner surface 212 of each bead 245 to include the first fiber 300. The first fiber 300 has the fourth CTE that differs from the first and second CTEs. As shown in block 110A3 (and FIGS. 6A-6B), forming the shroud base 80 may include printing the outer surface 202 to include the first fiber 300 having the fourth CTE, and the inner surface 212 to include the second fiber 310 that that has the fifth CTE that differs from each of the other CTEs.

As shown in block 110A4 (and FIGS. 7A-7B), forming the shroud base 80 may include printing, layer by layer, the reinforcing fibrous string 330 on each bead 245. The string 330 may extend linearly across the bead 245, over the center void 220 of the bead 245.

As shown in block 110A5, forming the shroud base 80 may include printing the first thermoplastic polymer surface 200 to provide a first CTE gradient CTE(Δ1), and printing the second thermoplastic polymer surface 210 to provide a second CTE gradient CTE(Δ2). As shown in FIGS. 8A-8B, the first and second gradients may change in a thickness direction of the shroud base 80. The CTEs may be the same as each other at the interface 360 between the first and second thermoplastic polymer surface 210. As shown in FIGS. 9A-9B, the first and second gradients may change in a circumferential direction. The CTEs may differ from each other at the interface 360 between the first and second thermoplastic polymer surface 210.

As shown in block 110A6 (and FIG. 4B), forming the shroud base 80 may include printing, layer by layer, a continuous structure 247 having voids 220. The continuous structure 247 may be formed by the first thermoplastic polymer surface 200. Each of the voids 220 may be lined with the second thermoplastic polymer surface 212.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of forming a shroud for an air cycle machine (ACM), the method comprising:

forming a shroud base having a plurality of discrete sections including: a first section defining connecting features for connecting with a fixed structure of the ACM; a second section that is positioned adjacent to a compressor rotor when installed in the ACM; and a third section that is disposed adjacent to a drive ring bearing when installed in the ACM, wherein forming the shroud base includes:

printing, layer by layer, the shroud base, by printing first and second thermoplastic polymer surfaces, respectively from first and second thermoplastic polymers, that are disposed against each other, the first thermoplastic polymer surface having a first coefficient of thermal expansion (CTE), and the second thermoplastic polymer surface having a second CTE;

forming a lower support section on the shroud base by printing, layer by layer, along the plurality of discrete sections of the shroud base a mixture of a third thermoplastic polymer and a catalyst formed with metal; and forming an upper support section on the shroud by depositing on the lower support section, along each of the discrete sections, via electrolysis deposition, a metallic coating, to thereby control thermal expansion and contraction of the shroud along the plurality of discrete sections, to thereby make the shroud.

2. The method of claim 1, wherein the first and second CTEs differ from each other.

3. The method of claim 1, wherein:

forming the shroud base includes printing, layer by layer, a lattice of beads, wherein each of the beads has an outer surface formed by the first thermoplastic polymer surface and an inner surface formed by the second thermoplastic polymer surface, and wherein a void is formed in a center of each of the beads.

4. The method of claim 3, wherein:

the outer surface has first thickness and the inner surface has a second thickness that is greater than the first thickness.

5. The method of claim 4, wherein:

forming the shroud base includes printing the outer surface or the inner surface of each bead to include a first fiber having a fourth CTE that differs from the first and second CTEs.

6. The method of claim 5, wherein:

forming the shroud base includes printing the outer surface to include the first fiber having the fourth CTE and the inner surface to include a second fiber that that has a fifth CTE.

7. The method of claim 6, wherein the first fiber and the second fiber differ from each other, each being one of metallic, carbon or Kevlar fibers.

8. The method of claim 3, wherein:

forming the shroud base includes printing, layer by layer, a reinforcing fibrous string on each bead, wherein the reinforcing fibrous string extends linearly across the bead, over the void of the bead.

9. The method of claim 3, wherein forming the shroud base includes:

printing the first thermoplastic polymer surface to provide a first CTE gradient; and printing the second thermoplastic polymer surface to provide a second CTE gradient.

10. The method of claim 9, wherein:

the first and second CTE gradients change in a thickness direction of the shroud base; or the first and second CTE gradients change in a circumferential direction.

11. The method of claim 1, wherein:

forming the shroud base includes printing, layer by layer, a continuous structure having voids, where the continuous structure is formed by the first thermoplastic polymer surface, and each of the voids is lined with the second thermoplastic polymer surface.

12. The method of claim 1, wherein the first and second thermoplastic polymer surfaces are the same as each other.

13. The method of claim 1, wherein the first thermoplastic polymer surface is Acrylonitrile butadiene styrene (ABS).

14. The method of claim 1, wherein the catalyst is palladium (II) chloride ($PdCl_2$).

15. The method of claim 1, including utilizing stereolithography (SLA) or fused deposition modeling (FDM).

* * * * *